United States Patent [19]

Takahashi

[11] Patent Number: 5,058,831
[45] Date of Patent: Oct. 22, 1991

[54] EMERGENCY ESCAPE UNIT

[76] Inventor: Shigeki Takahashi, 8-2 Higashihagoromo 1-chome, Takaishi-shi, Osaka-Fu, Japan

[21] Appl. No.: 460,493
[22] Filed: Jan. 3, 1990

[30] Foreign Application Priority Data

May 19, 1989 [JP] Japan ................................. 1-127441

[51] Int. Cl.⁵ ..................... B64D 17/00; B64D 17/02; B64D 17/30
[52] U.S. Cl. .............................. 244/142; 244/138 R; 244/145; 244/151 R
[58] Field of Search ................... 244/142, 151 R, 146, 244/145, 31, 138 R, 152, 151 A

[56] References Cited

U.S. PATENT DOCUMENTS

| 1,322,806 | 11/1919 | Marshall | 244/138 R |
|---|---|---|---|
| 1,337,788 | 4/1920 | Mott | 244/146 |
| 1,572,889 | 2/1926 | Degen | 244/138 R |
| 1,810,488 | 6/1931 | Lehmann | 244/146 X |
| 1,861,784 | 6/1932 | Brown et al. | 244/138 R |
| 1,929,005 | 10/1933 | Rolkerr | 244/146 |
| 2,369,286 | 2/1945 | De Lopez | 244/146 |
| 2,399,100 | 4/1946 | Carr | 244/142 |
| 2,449,813 | 9/1948 | Lawson | 244/138 R X |
| 2,640,666 | 6/1953 | Cerrella | 244/152 X |
| 2,952,429 | 9/1960 | Kostelezky | 244/145 |
| 3,759,469 | 9/1973 | Nimylowycz | 244/142 X |
| 3,848,834 | 11/1974 | Phillips, Jr. | 244/145 |
| 4,105,173 | 8/1978 | Bücker | 244/146 |
| 4,562,981 | 1/1986 | Smith et al. | 244/146 |

FOREIGN PATENT DOCUMENTS

| 96194 | 10/1923 | Austria | 244/138 R |
|---|---|---|---|
| 265501 | 6/1929 | Italy | 244/138 R |
| 555831 | 9/1943 | United Kingdom | 244/138 R |

Primary Examiner—Margaret A. Focarino
Assistant Examiner—James M. Kannofsky
Attorney, Agent, or Firm—Edwin E. Greigg; Ronald E. Greigg

[57] ABSTRACT

The present invention discloses an emergency escape unit to be used in case of an emergency such as a fire, an earthquake or the like, such that the user safely escapes from a high building with the use of this escape unit. In the emergency escape unit of the present invention, a light-weight gas such as helium, air or the like, filled in a bomb may be quickly released into a sack-like canopy, causing the canopy to be expanded in the form of an umbrella, so that the air resistance during descent is quickly increased, enabling the user to fall slowly. When helium is used as the light-weight gas to be released into the sack-like canopy, provision is made such that buoyancy is generated.

4 Claims, 4 Drawing Sheets

Fig.3
Fig.4
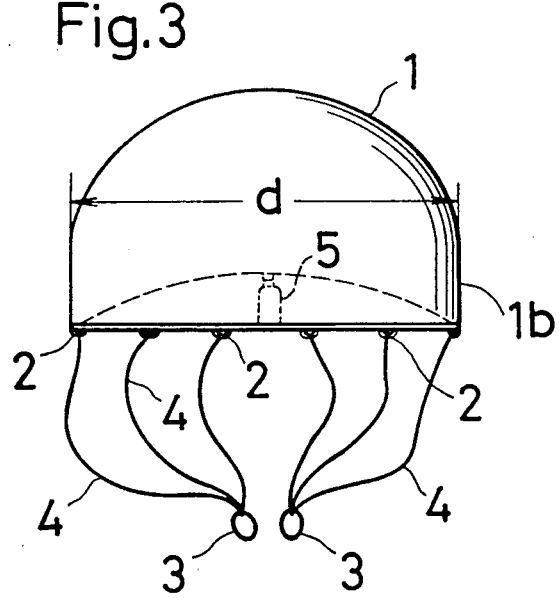
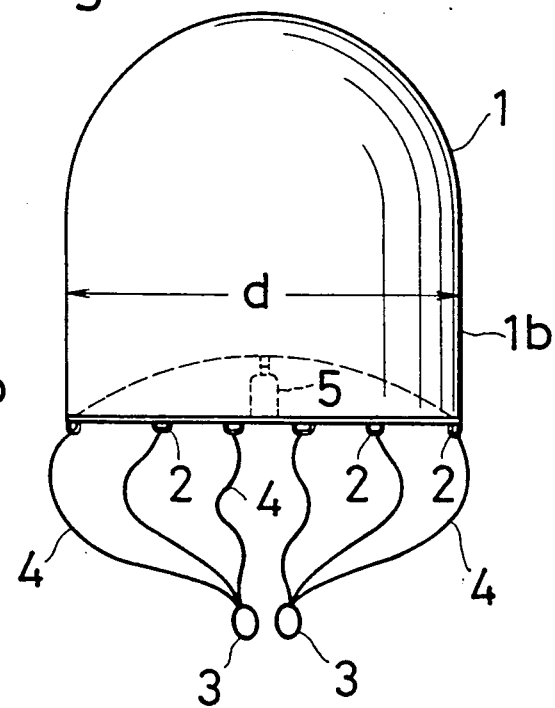
Fig.5
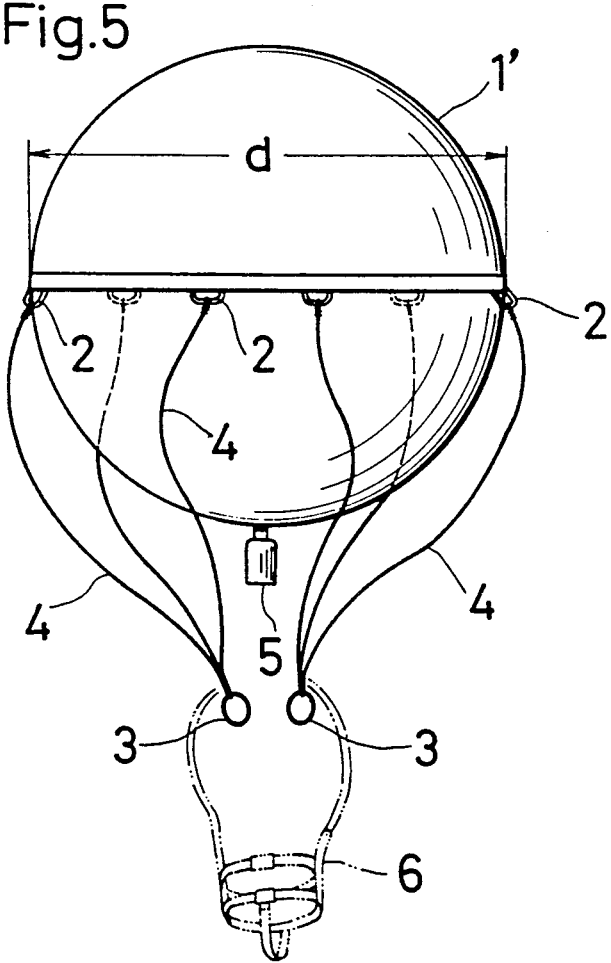

EMERGENCY ESCAPE UNIT

BACKGROUND OF THE INVENTION

The present invention relates to an emergent escape unit adapted to be used in case a high building such as a hotel, an office building or the like is on fire or in case such a high building is damaged due to an earthquake causing the elevator to come to a dead stop, thereby preventing people in the building from coming downstairs.

Due to the high cost of urban land architectural techniques have caused the development of buildings much higher than before. Such multistoried buildings pose risks of fire and earthquake danger, thereby raising the desirability of precaution against a disaster. However, if a building is actually on fire or subject to an earthquake causing the elevator to come to a dead stop, the safety of people upstairs is not assured since such people are so far from the ground.

Conventional multistoried buildings have often no facilities to provide for a disaster such as a fire, an earthquake or the like. As a matter of fact, there was reported on the news that, in Brazil, a fire started at a high building and caused a great loss of life because the building did not have a device which enabled the occupants to get away from the building in a safe manner.

As emergency escape units, there are known (i) a unit having a winch installed at the upper portion of an outer wall of a building, adapted to slowly lower people, one by one, with the use of a rope, (ii) a rope disposed at a corner of a room with which people escape from the room with the rope wound on the fixed portion of a pillar, furniture or the like in the room in case of a fire, and (iii) similar techniques.

However, when people escape with the use of such a rope, a number of people cannot come down simultaneously. Further, if the building quickly catches on fire, there are instances where the rope is burnt in the middle course of descent and people fall to their death. Thus, safety is not assured.

As a method of escaping from a high building, it has been considered to make a parachute descent as done from an airplane.

However, when people escape with parachutes, there is no warranty that the parachutes are securely opened. Accordingly, the use of parachutes may be rather dangerous.

SUMMARY OF THE INVENTION

It is an object of the present invention to provide an emergency escape unit enabling people confined in multistoried floors of a building to securely escape therefrom in a safe manner in case a fire or an earthquake prevents the elevator from being used.

The emergency escape unit in accordance with the present invention comprises:

a sack-like canopy adapted to be filled with light-weight gas;

a plurality of strings connected to a plurality of string securing means attached to the peripheral edge of the sack-like canopy;

ring members into which the wrists of the user are adapted to be fitted, or fitting means adapted to be mounted on the user's body, the ring members or fitting means being connected to the strings which are bundled; and a gas bomb containing a light-weight gas adapted to be released into the sack-like canopy so as to inflate same.

According to a preferred embodiment of the present invention, the sack-like canopy is adapted to be hemispherical when the same is filled with helium gas.

Further, even though a person were to jump down from a high building with the use of the emergency escape unit above-described, he could escape from the high building in a safe manner.

More specifically, if a fire started, the user may insert both hands into the ring members or mount the fitting means on his body. Then, the user may put the sack-like canopy outside of the window, and remove the pin of, or loosen the valve of the gas bomb containing light-weight gas such as helium gas, nitrogen gas or air, causing the sack-like canopy to be quickly expanded. Then, when the user jumps down from the window, he may slowly descend in a safe manner because of the air resistance of the canopy.

Further, when the sack-like canopy is filled with helium gas, buoyancy is added. This buoyancy factor enables the user to descend more slowly and thus more safely.

BRIEF DESCRIPTION OF THE DRAWINGS

FIG. 2 (b) is a view of a ring member of the emergency escape unit into which a wrist of the user is fitted;

FIGS. 3 to 5 are views of modifications of the emergency escape unit in accordance with the present invention;

DESCRIPTION OF THE PREFERRED EMBODIMENT

The following description will discuss preferred embodiments of the present invention with reference to the attached drawings.

Figure 1:
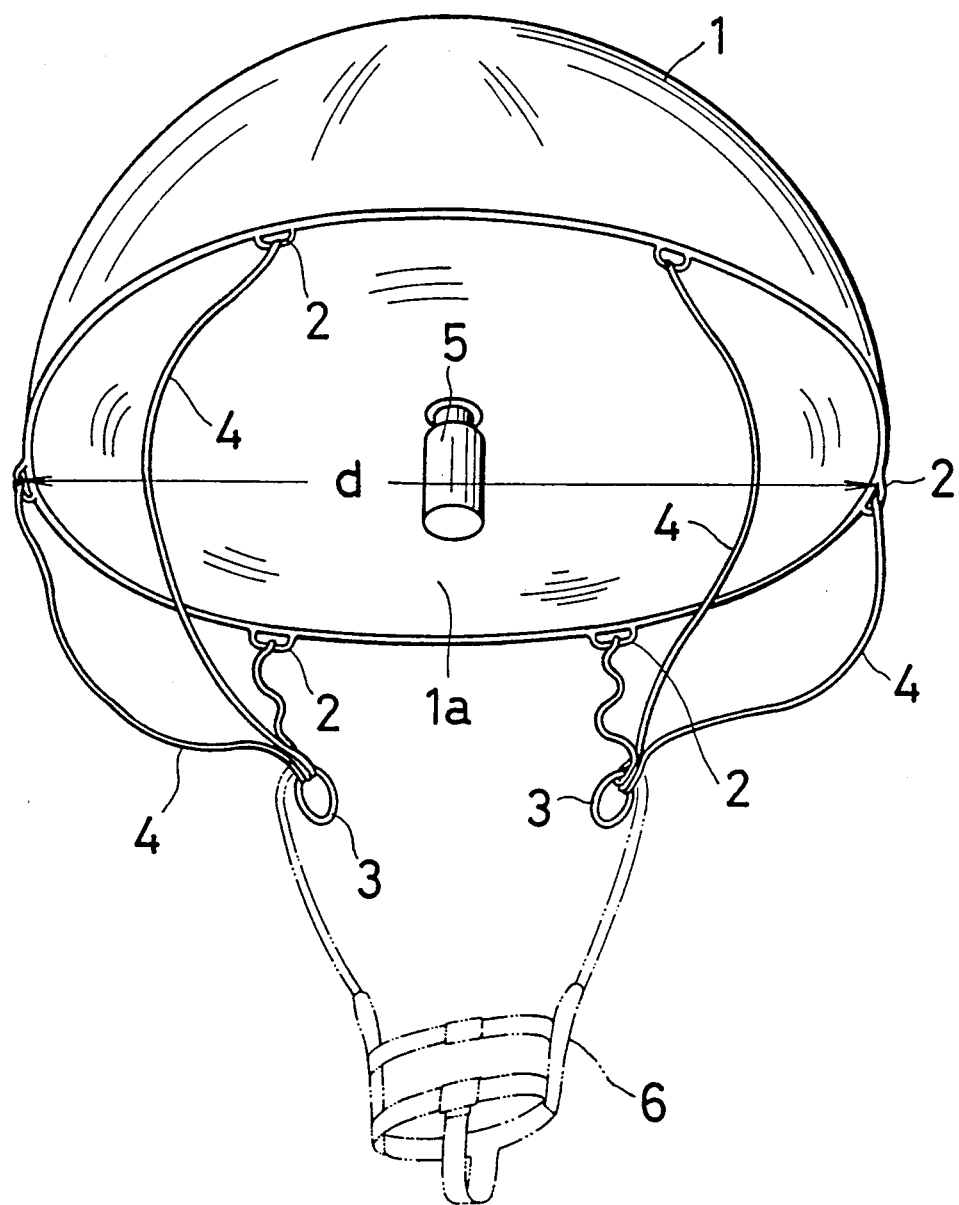
FIG. 1 is a perspective view, obliquely taken from below, of an emergency escape unit in accordance with the present invention.

FIG. 1 is a perspective view, obliquely taken from below, of an emergency escape unit in accordance with the present invention.

In FIG. 1, a sack-like canopy 1 is shown adapted to be filled with a light-weight gas such as helium gas, nitrogen gas, air or the like. The sack-like canopy 1 may be made of a strong, light-weight synthetic resin fabric from which no gas leaks, such as nylon, rayon, plastic film or the like. Preferably, the underside 1a of the sack-like canopy 1 is adapted to be inwardly concaved when the air resistance is applied thereto during descent.

The sack-like canopy 1 has string securing means (rings) 2 attached to the periphery thereof. The string securing means 2 are preferably disposed at regular spatial intervals on the peripheral edge of the sack-like canopy 1. This advantageously exerts force to the edge of the canopy 1 at regular spatial intervals during descent.

There are disposed ring members into which the wrists of the user are adapted to be fitted. A plurality of strong ropes or strings 4 are attached to the string securing means 2. One half of these strings 4 are connected, as bundled, to each of the ring members 3. The ring members 3 are preferably arranged such that the wrists cannot come out therefrom when force is exerted thereto, as done with a band connected to a dog collar, such band being used when a dog is walked.

A gas bomb 5 contains, under high-pressure, light-weight gas or air such as helium gas or nitrogen gas. The gas bomb 5 is preferably made of a light-weight and pressure-resistant material such as titanium, an aluminium alloy, resin or the like. Preferably, the inside of the gas bomb 5 is thermally insulated and contains, under high- or low-pressure, liquid helium, liquid nitrogen or the like which is adapted to be instantaneously transformed into gas when the pin of the bomb is pulled out or the valve is opened, causing the liquid to gush into the sack-like canopy 1 in which temperature and pressure are normal.

As best shown in FIG. 5, instead of the ring members 3, there may be used fitting means 6 adapted to be mounted about the waist of the user, below the chest, and may include a crotch strap in the form of a T-shape band. Even though such means 6 includes a T-shape band, it may be so arranged as to be mounted on the user's body in any way.

The emergency escape unit having the arrangement above-mentioned in accordance with the present invention may be generally placed on a shelf or in a storage case in a room. In case a high building should take fire and people be confined in the building, the emergency escape unit of the present invention may be used in the following manner.

Figure 2:
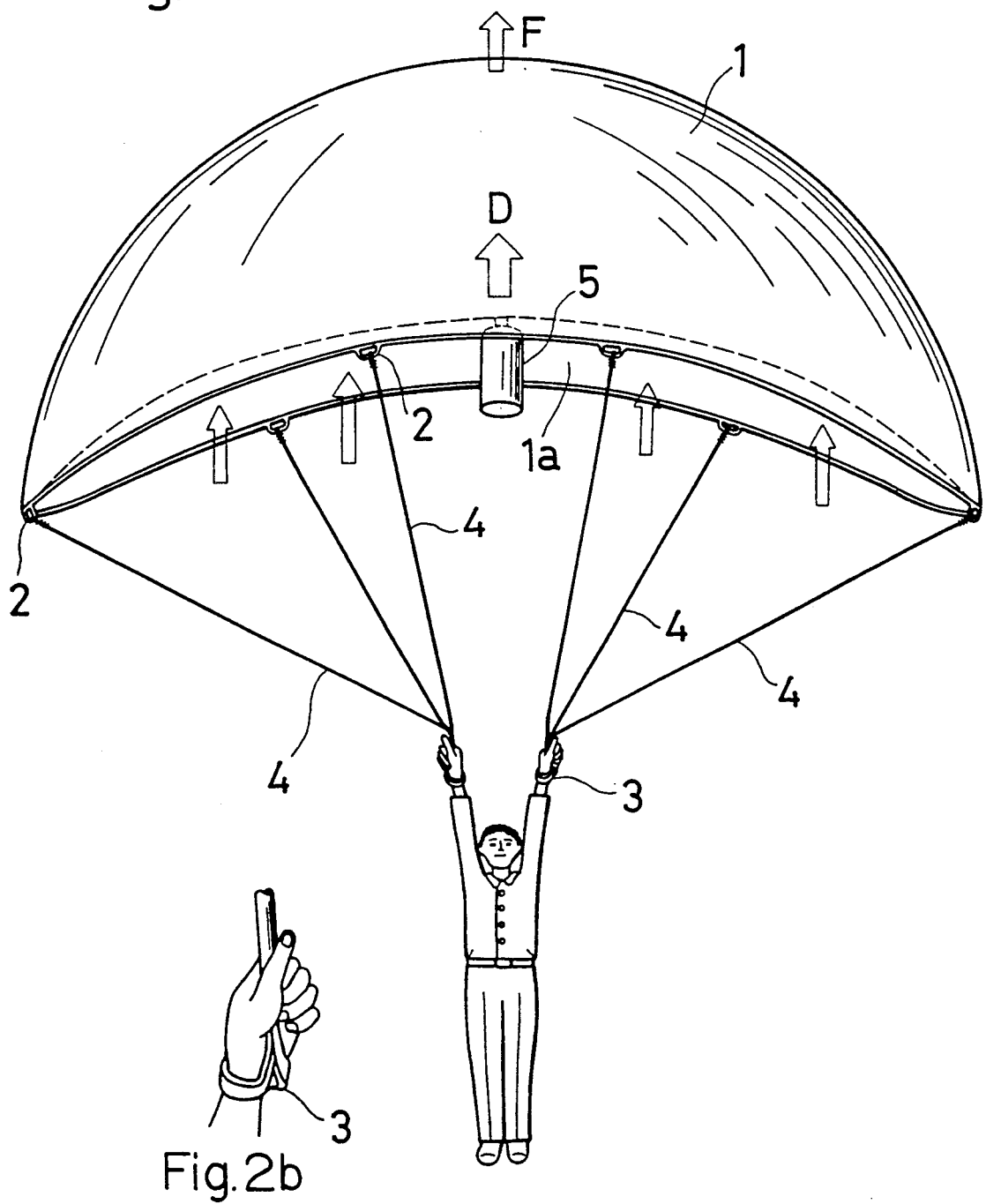
FIG. 2 (a) is a view showing a person who slowly descends with the use of the emergency escape unit in accordance with the present invention.

When placed in storage, the emergency escape unit is folded into a small size with the light-weight gas in the sack-like canopy 1 removed. In case a fire or the like started, the user may take out the emergency escape unit and insert his wrists into the ring members 3 or mount the fitting means 6 on his body. Then, the user may put the sack-like canopy 1 outside of the window, after which the pin or valve of the gas bomb 5 is removed or loosened. The light-weight gas is then discharged into the sack-like canopy 1, causing the same to be expanded. Then, the user may jump out from the window. As shown in FIG. 2 (a), the user may make a landing on the ground at such a speed that there is no fear of his death, because of air resistance D applied from below during descent and the buoyancy F of the light-weight gas (in particular, helium gas) in the sack-like canopy.

At this time, force is equally exerted to the string securing means 2 attached to the sack-like canopy 1, thereby to stabilize the descent. Further, the ring members 3 may be preferably arranged such that the wrists fitted therein are not apt to be pulled therefrom when force is exerted thereto.

The emergency escape unit in accordance with the present invention is characterized in that, as quickly filled with light-weight gas such as helium gas, air or the like, the sack-like canopy 1 is expanded and made in the form of an umbrella, so that the air resistance is quickly increased and the buoyancy is generated at the falling time. Accordingly, the umbrella shape is not formed with the use of air resistance as done in a parachute, but is already being formed at the point of time when the user jumps out. It is therefore not required that the user jumps out from a very high place such that the falling speed is so high as to cause the sack-like canopy 1 to be opened.

In the following explanation, there will be verified the safety of the emergency escape unit in accordance with the present invention at the time when the user escapes.

The sack-like canopy 1 of the emergency escape unit is hemi-spherical and, as shown in FIG. 2 (a), the bottom 1a is slightly inwardly expanded in the form of a concavity when the user starts descending.

In the following description, calculation is made with this bottom 1a having a diameter d of 4 m. Since the flow in the air is relatively slow, it may be assumed that the air flow is uniform. In this case, the resistance D may be expressed by the following equation (1):

$$D = C_D \cdot \tfrac{1}{2} \cdot \rho \cdot U^2 \cdot S \qquad (1)$$

where
$C_D$: Resistance coefficient
$\rho$: Air density
U: Falling speed (m/sec), and
S: Projection area of the sack-like canopy 1 on the plane at a right angle to the falling direction In this case, $C_D$ is equal to 1.33 ("Hydraulic Dynamics", Yukio TOMITA and Shinzo YAMASAKI, published by Sangyo Tosho Shuppan Co., Ltd., 1978, January, 175 pages). S is equal to 12,56 (m²) and $\rho$ is equal to 0.132 (air Kg s²/m⁴). Accordingly, if it is presumed that the total weight of the body weight of a person and the weight of the gas bomb is 80 Kgf. and this total weight is balanced with the resistance D, the falling speed U (final speed) may be calculated as follows:

$$U = 8.52 \text{ (m/sec)} \qquad (2)$$

This speed is equivalent to a speed generated when people jump down from a place having a height of 3.70 m from the ground. When people jump down from such a height, this hardly involves a risk to the life. Even though the weight of the gas bomb 5, the total weight of the user or the unit is greater than 80 kg, the falling speed is merely slightly increased. Accordingly, even though the user jumps down from a high building with the use of the emergency escape unit, the falling speed is in such a range. It may therefore be considered that, even though the user may suffer an injury, e.g., a broken bone, the user should not lose his life.

On the other hand, when the sack-like canopy 1 is filled with helium gas, the buoyancy factor F acts on the emergency escape unit. When it is now presumed that the diameter d is equal to 4 m, the cubic volume of the sack-like canopy 1 being hemi-spherical is approximately calculated as follows:

$$V = 16.74 \text{ (m}^3\text{)} \qquad (3)$$

The molecular weight of air is apparently equal to 29 g/mol, and the molecular weight of helium is equal to 4 g/mol. Accordingly, the buoyancy w per unit volume (m³) may be calculated as follows:

$$w = 1.12 \text{ (Kgf/m}^3\text{)}$$

According to the Archimedean principle, the buoyancy factor F may be calculated with the use of the equation of $F = w \times V$, as follows:

$$F = 18.74 \text{ Kgf} \qquad (4)$$

When the helium gas is used, the buoyancy F is added to the resistance D. Accordingly, a heavier person may also be saved. Further, the diameter d of the sack-like canopy 1 may be increased to 4.5 m, 5 m or the like, so that the resistance D is proportionally increased. This decreases the falling speed U, enabling the user to make a landing in a safer manner. Thus, the diameter d of the sack-like canopy 1 is preferably increased for a heavier person. In this case, however, it is required to accordingly increase the capacity of the gas bomb 5, resulting in an increase in the weight thereof. Thus, the diameter d of the sack-like canopy 1 should be modified within a safe and suitable range according to the user's average body weight. It is noted that the diameter d of the sack-like canopy 1 may be about 2 m for a child having a body weight of 30 to 40 kgf.

FIGS. 3 to 5 show modifications of the emergent escape unit of the present invention.

In the modification in FIG. 3, the sack-like canopy 1 has a short cylindrical skirt portion 1b in order to increase the amount of the light-weight gas to be contained in the sack-like canopy 1.

In the modification in FIG. 4, the sack-like canopy 1 has a cylindrical skirt portion 1b longer than that in the modification in FIG. 3.

Such an arrangement provides the sack-like canopy 1 an increased volume, and is advantageous in that the buoyancy is accordingly increased when the sack-like canopy 1 is filled with helium gas.

FIG. 5 shows a modification of the present invention in which the canopy 1' is adapted to be generally spherical when the canopy is filled with light-weight gas. In this modification, when the canopy 1' has a diameter d of 5 m and is filled with helium gas, the buoyancy F alone presents about 73 Kgf. In this case, when the Reynolds number of the air flow is equal to or smaller than the critical value, the resistance coefficient $C_D$ is equal to 0.47, and when the Reynolds number of the air flow is greater than the critical value, the resistance coefficient $C_D$ is equal to 0.10. Accordingly, the resistance is added to the buoyancy during descent, so that the user's safety is further assured.

In the embodiment and modifications above-mentioned of the present invention, provision may be made such that, after the sack-like canopy 1 or the spherical canopy 1' has been filled with light-weight gas, the gas bomb 5 is separated from the canopy and a stopper is used. In this case, the emergent escape unit is lighter in weight and the falling speed is decreased. Thus, the safety is still further assured. Alternatively, an outlet plug for compressed air may be disposed in a room and the sack-like canopy 1 may be quickly filled with air. In this case, the bomb itself may be eliminated, providing convenience and weight saving.

Figure 6:
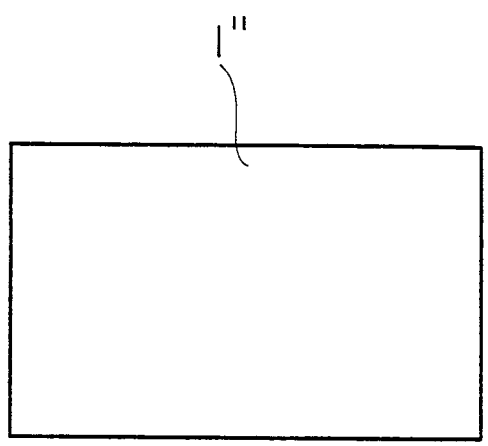
FIG. 6 illustrates a top view of an escape unit canopy having a rectangular sectional shape.
Figure 7:
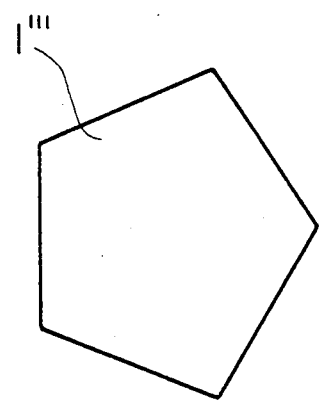
FIG. 7 illustrates a top view of an escape unit canopy having a polygonal sectional shape.

Further, the sectional shape of the sack-like canopy 1 is not limited to a circle, but may be a rectangle 1' or a polygon 1''' as shown in FIGS. 6 and 7, respectively.

As thus described in the foregoing, the emergency escape unit in accordance with the present invention may be used in case a fire or other disaster struck the tall buildings which have been extensively constructed in recent years. More specifically, if a person is confined in a room of such a high building on fire or the like, the sack-like canopy 1 may be quickly filled with light-weight incombustible gas such as air, nitrogen gas, helium gas or the like, with the use of the high-pressure bomb 5, causing the sack-like canopy 1 to be expanded, so that the person can quickly escape from the window of the building and make a landing at a sufficiently safe falling speed.

What is claimed is:

1. An emergency escape unit adapted to present, upon descent, a drag factor D sufficient to slow descent of a falling person, such drag factor being represented by the following formula:

$$D = C_D \cdot \tfrac{1}{2} \cdot \rho \cdot U^2 \cdot S$$

where
  $C_D$: Drag coefficient
  $\rho$: Air density
  $U$: Falling speed
  $S$: Projected area of a sack-like canopy on the plane at a right angle to the falling direction and comprising:
  a sack-like canopy adapted to receive a gas in an underside portion thereof to inflate same so that said drag coefficient $C_D$ becomes greater than 1;
  a plurality of strings connected to a plurality of string securing means attached to a peripheral edge of said sack-like canopy, said plurality of strings being bundled into two groups;
  two strap members into one each of which a wrist of a user is adapted to be received, each said strap member being connected to one of said groups of said plurality of strings; and
  a gas bomb containing light-weight gas adapted to be released into said sack-like canopy,
  whereby said canopy may be deployed and inflated for safe descent by a user jumping from a building in which he is trapped.

2. An emergency escape unit as defined in claim 1 in which said canopy is hemispherical in shape.

3. An emergency escape unit as defined in claim 1 in which said canopy is rectangular in shape.

4. An emergency escape unit as defined in claim 1 in which said canopy is polygonal in shape.

* * * * *